US012795374B2

(12) United States Patent
Khare et al.

(10) Patent No.: US 12,795,374 B2
(45) Date of Patent: Nov. 10, 2026

(54) METHODS AND RELATED APPARATUSES FOR EXTENDING AN EXPIRATION TIME PERIOD OF A TELECOMMUNICATIONS ACCESS TOKEN

(71) Applicant: Nokia Technologies Oy, Espoo (FI)

(72) Inventors: Saurabh Khare, Bangalore (IN); Ranganathan Mavureddi Dhanasekaran, Munich (DE)

(73) Assignee: Nokia Technologies Oy, Espoo (FI)

( * ) Notice: Subject to any disclaimer, the term of this patent is extended or adjusted under 35 U.S.C. 154(b) by 266 days.

(21) Appl. No.: 18/784,868

(22) Filed: Jul. 25, 2024

(65) Prior Publication Data

US 2026/0122505 A1 Apr. 30, 2026

(30) Foreign Application Priority Data

Jul. 27, 2023 (IN) ............................ 202311050593

(51) Int. Cl.

| | |
|---|---|
| ***H04W 12/61*** | (2021.01) |
| ***H04L 5/00*** | (2006.01) |
| ***H04W 12/069*** | (2021.01) |
| *H04W 84/04* | (2009.01) |
| *H04W 84/06* | (2009.01) |

(52) U.S. Cl.
CPC ........... *H04W 12/61* (2021.01); *H04L 5/0053* (2013.01); *H04W 12/069* (2021.01); *H04W 84/042* (2013.01); *H04W 84/06* (2013.01)

(58) Field of Classification Search
CPC . H04W 12/61; H04W 12/069; H04W 84/042; H04W 84/06; H04W 88/14; H04W 12/068; H04L 5/0053; H04L 63/166; H04L 9/3213; H04B 7/18519
See application file for complete search history.

(56) References Cited

U.S. PATENT DOCUMENTS

2024/0163271 A1* 5/2024 Krishan .................. G06F 21/33
2025/0220554 A1* 7/2025 Kumar ................ H04W 36/247

OTHER PUBLICATIONS

"3rd Generation Partnership Project; Technical Specification Group Services and System Aspects; Network Domain Security (NDS); Authentication Framework (AF) (Release 18)", 3GPP TS 33.310, V18.0.0, Mar. 2023, pp. 1-61.

"3rd Generation Partnership Project; Technical Specification Group Core Network and Terminals; 5G System; Network Function Repository Services; Stage 3 (Release 18)", 3GPP TS 29.510, V18.3.0, Jun. 2023, pp. 1-347.

"3rd Generation Partnership Project; Technical Specification Group Services and System Aspects; Security architecture and procedures for 5G system (Release 18)", 3GPP TS 33.501, V18.5.0, Mar. 2024, pp. 1-330.

* cited by examiner

*Primary Examiner* — Fred A Casca
(74) *Attorney, Agent, or Firm* — Barta Jones, PLLC

(57) ABSTRACT

The expiration time period of a telecommunications access token may be extended to a time period that allows for mobile communications to be established and maintained.

20 Claims, 16 Drawing Sheets

Type: AmfInfo (Nnrf _NFManagement Service API)
Table 6.1.6.2.11-1: Definition of type AmfInfo

| Attribute name | Data type | P | Cardinality | Description |
|---|---|---|---|---|
| amfRegionId | AmfRegionId | M | 1 | AMF region identifier |
| amfSetId | AmfSetId | M | 1 | AMF set identifier |
| guamiList | array(Guami) | M | 1..N | List of supported GUAMIs |
| taiList | array(Tai) | O | 1..N | The list of TAIs the AMF can serve. It may contain one or more non-3GPP access TAIs. The absence of this attribute and the taiRangeList attribute indicate that the AMF can be selected for any TAI in the serving network. |
| taiRangeList | array(TaiRange) | O | 1..N | The range of TAIs the AMF can serve. It may contain non-3GPP access T AIs. The absence of this attribute and the tailist attribute indicate that the AMF can be selected for any TAI in the serving network. |
| backupInfoAmfFailure | array(Guami) | O | 1..N | List of GUAMIs for which the AMF acts as a backup for AMF failure |
| backupInfoAmfRemoval | array(Guami) | O | 1..N | List of GUAMIs for which the AMF acts as a backup for planned AMF removal |
| n2InterfaceAmfInfo | N2InterfaceAmfInfo | O | 0..1 | N2 interface information of the AMF. This information needs not be sent in NF Discovery responses. It may be used by the NRF to update the DNS for AMF discovery by the 5G Access Network. The procedures for updating the DNS are out of scope of this Specification. |
| amfOnboardingCapability | boolean | O | 0..1 | When present, this IE indicates the AMF supports SNPN Onboarding capability. This is used for the case of Onboarding of UEs for SNPNs (see 3GPP TS 23.501 [2], clause 5.30.2.10).<br><br>- false (default): AMF does not support SNPN Onboaiding;<br>- true: AMF supports SNPN Onboarding. |

FIG. 2A

| | | | | |
|---|---|---|---|---|
| highlatencyCom | boolean | O | 0..1 | When present, this IE indicates whether the AMF supports High Latency communication (e.g. for NR RedCap UE). This is used for CP NF to discover AMF supporting High Latency communication (see 3GPP TS 23.501 [2], clause 6.3.5).<br><br>- true: AMF supports High Latency communication e.g . for NR RedCap UE;<br>- false: AMF does not support High Latency communication e.g. for NR RedCap UE. |
| SupportSatMobility | boolean | O | 0..1 | When present, this IE indicates whether the AMF Is on-board in Satellite.<br><br>- True AMF is available on board in gNBSatellite.<br>- False : AMF is not available on board in gNB-Satellite |

IE 1

FIG. 2B

Type: AccessTokenReq (Nnrf_AccessToken API)
Table 6.3.5.2.2-1. Definition of type AccessTokenReq

| Attribute name | Data type | P | Cardinality | Description |
|---|---|---|---|---|
| grantLtype | string | M | 1 | This IE shall contain the grant type as "client_credentials". Enum: "client credentials" |
| nfInstanceId | NfInstanceId | M | 1 | This IE shall contain the NF instance id of the NF service consumer |
| nfType | NFType | C | 0..1 | This IE shall be included when the access token request is for an NF type and not for a specific NF/ NF service instance. When present, this IE shall contain the NF type of the NF service consumer. (NOTE 3) |
| targetNfType | NFType | C | 0..1 | This IE shall be included when the access token request is for an NF type and not for a specific NF/ NF service instance. When present this IE shall contain the NF type of the NF service producer. |
| scope | string | M | 1 | This IE shall contain the scopes requested by the NF service consumer. The scopes shall consist of a list of NF service name(s) of the NF service producer(s) or resource/operation-level scopes defined by each service API, separated by whitespaces, as described in IETF RFC 6749 [16], clause 3.3. The service name(s) included in this attribute shall be any of the services defined in the ServiceName enumerated type (see clause 6.1.6.3.11 ). The resource/operation-level scopes shall be any of those defined in the "securitySchemes" clause of each service API. pattern: '^A([a-zA-Z0-9_:-)+) ([a-zA-Z0-9_:-]+)*$' See NOTE 2. |
| targetNfInstanceId | NfInstanceId | C | 0..1 | This IE shall be included, if available and if it is an access token request for a specific NF Service Producer. When present this IE shall contain the NF Instance ID of the specific NF Service Producer for which the access token is requested. |

FIG. 2C

| | | | | |
|---|---|---|---|---|
| requesterPlmn | PlmnId | C | 0..1 | This IE shall be included when the NF service consumer in one PLMN requests a service access authorization for an NF service producer from a different PLMN. It may be present when a service access authorization in the same PLMN need to be requested.<br>When present, this IE shall contain the PLMN ID of the requester NF service consumer.<br>(NOTE 3) (NOTE 4) |
| requesterPlmnList | array(PlmnId) | C | 2..N | This IE shall be included when the NF service consumer serving a PLMN, with more than one PLMN ID, requests a service access authorization for an NF service producer from a different PLMN. It may be present when a service access authorization in the same PLMN, with more than one PLMN ID, need to be requested.<br>When present, this IE shall contain the PLMN IDs of the requester NF service consumer.<br>(NOTE4) |
| requesterSnssaiList | array(Snssai) | C | 0..1 | When present, this IE shall contain the list of SNSSAIs of the requester NF service consumer.<br>If this IE is included in an Access Token Request sent towards a different PLMN, the requester NF shall provide S-NSSAI values of the target PLMN, that correspond to the S-NSSAI values of the requester. |

FIG. 2D

| | | | | |
|---|---|---|---|---|
| | | | | NF.<br>This may be used by the NRF to validate that the requester NF service consumer is allowed to access the taraet NF Service Producer. (NOTE 3) |
| requesterFqdn | Fqdn | O | 0..1 | When present, this IE shall contain the FQDN of the requester NF Service Consumer.<br>This may be used by the NRF to validate that the requester NF service consumer is allowed to access the target NF Service Producer. (NOTE 3) |
| requesterSnpnList | array(PlmdIdNid) | O | 1..N | When present, this IE shall contain the list of SNPNs the requester NF service consumer belongs to.<br>This may be used by the NRF to validate that the requester NF service consumer is allowed to access the target NF Service Producer. (NOTE 3) |
| targetPlmn | PlmnId | C | 0..1 | This IE shall be included when the NF service consumer in one PLMN or SNPN requests a service access authorization for an NF service producer from a different PLMN.<br>When present, this IE shall contain the PLMN ID of the target PLMN (i.e., PLMN ID of the NF service producer) |
| targetSnpn | PlmnIdNid | C | 0..1 | This IE shall be included when the NF service consumer in one PLMN or SNPN requests a service access authorization for an NF service producer from a different SNPN.<br>When present, this IE shall contain the SNPN ID of the target SNPN (i.e., SNPN ID of the NF service producer). |
| targetSnssaiList | array(Snssai) | O | 1..N | This IE may be included during an access token request for an NF type and not for a specific NF/ NF service instance. When present this IE shall contain the list of S-NSSAIs of the NF Service Producer. |

FIG. 2E

| | | | | |
|---|---|---|---|---|
| targetNsiList | array(string) | O | 1..N | This IE may be included during an access token request for an NF type and not for a specific NF/ NF service instance. When present, this IE shall contain the list of NSIs of the NF Service Producer. |
| targetNfSetId | NfSetId | O | 0..1 | This IE may be included during an access token request for an NF type and not for a specific NF/ NF service instance. When present, this IE shall contain the NF Set ID of the NF Service Producer. |
| targetNfServiceSetID | NfServiceSetID | O | 0..1 | This IE may be included during an access token request for a specific NF/ NF service instance. When present, this IE shall contain the NF Service Set ID of the NF Service Producer. This may be used by the NRF to validate that the requester NF service consumer is allowed to access the target NF service instance. (NOTE 3) |
| hnrfAccessTokenUri | Uri | C | 0..1 | If included, this IE shall contain the API URI of the Access Token Service (see clause 6.3.2) of the NRF in home PLMN. It shall be included during an access token request for an hSMF in the home routed roaming scenario, if it is returned from the NSSF in the home PLMN (see clause 6.1.6.2.11 of 3GPP TS 29.531 [42]). |
| sourceNfInstaceID | NfInstanceId | C | 0..1 | This IE shall be included, if available and if it is an access token request from the DCCF as NF Service Consumer request data from NF Service Producers on behalf of the source NF. When present this IE shall contain the NF Instance ID of the source NF which intend to collects data from NF Service Producer. |
| SatMobility | Boolean | C | 0..1 | True or false to indicate the NRF that requester NF service consumer is in Satellite |

IE 2

FIG. 2F

NOTE 1: This data structure shall not be treated as a JSON object. It shall be treated as a key, value pair data structure to be encoded using x-www-form-urlencoded format as specified in clause 17.13.4 of W3C HTML 4.01 Specification [26].
NOTE 2: Though scope attribute is optional as per IETF RFC 6749 [16], it is mandatory for 3GPP as per 3GPP TS 33.501 [15].
NOTE 3: An access token request should be rejected if the requester NF is not allowed to access the target NF based on the authorization parameters in the NF profile of the target NF. The authorization parameters in NF Profile are those used by NRF to determine whether a given NF Instance/ NF Service Instance can be discovered by an NF Service Consumer in order to consume its offered services (e.g. "allowedNfTypes", "allowedNfDomains", etc.). Based on operator's policies, an access token request not including the requester's information necessary to validate the authorization parameters in the target NF Profile may be rejected.
NOTE 4: When the NF service consumer is serving a PLMN consisting of one PLMN ID, the attribute "requesterPlmn" shall be used; otherwise, if the NF service consumer is serving a PLMN consisting of more than one PLMN ID, the attribute "requesterPlmnList" shall be used.

Type: AccessTokenRsp (Nnrf_AccessTokenRsp)
Table 6.3.5.2.3-1: Definition of type AccessTokenRsp

| Attribute name | Data type | P | Cardinality | Description |
|---|---|---|---|---|
| access_token | string | M | 1 | This IE shall contain JWS Compact Serialized representation of the JWS signed JSON object containing AccessTokenClaims (see clause 6.3.5.2 .4l. |
| token_type | string | M | 1 | This IE shall contain the token type, set to value "Bearer". Enum: "Bearer" |
| expires_in | integer | C | 0..1 | This IE when present shall contain the number of seconds after which the access token is considered to be expired. As indicated in IETF RFC 6749 [16], this attribute shoulld be included, unless the expiration time of the token is made available by other means (e.g. deployment-specific documentation).<br><br>For "AMFSATIndication set to true, the expiry timer is set to longer duration for example like 20 hours due to discontinuous reception or Store and forward functionalitv. |

IE 3

FIG. 2G

| | | | | |
|---|---|---|---|---|
| scope | string | C | 0..1 | This IE when present shall contain the scopes granted to the NF service consumer.<br><br>The scopes shall consist of a list of NF service name(s) of the NF service produoer(s) or resource/operation-level scopes defined by each service API, separated by whitespaces, as described in IETF RFC 6749 (16], clause 3.3.<br><br>The service name(s) included in this attribute shall be any of the services defined in the ServiceName enumerated type (see clause 6 .1.6.3.11 ).<br><br>The resource/operation-level scopes shall be any of those defined in the "securitySchemes" clause of each service API.<br><br>As indicated in IETF RFC 6749 (16), this attribute shall be present if it is different than the scope included in the access token request; if it is the same. |

FIG. 2H

| | | | | |
|---|---|---|---|---|
| | | | | as the requested scope, this attribute may be absent.<br><br>pattern: '^([a-zA-Z0-9_:-]+)( [a-zA-Z0-9_:-]+)*$' |

7.3.4 Type: AccessTokenClaims
Table: Definition of type AccessTokenClaims

| Attribute name | Data type | P | Cardinality | Description |
|---|---|---|---|---|
| iss | NfInstanceId | M | 1 | This IE shall contain NF instance id of the NRF. , corresponding to the standard "Issuer" claim described in IETF RFC 7519 [25], clause 4.1.1 |
| sub | NfInstanceId | M | 1 | This IE shall contain the NF instance ID of the NF service consumer, corresponding to the standard "Subject" claim described in IETF RFC 7519 [25], clause 4.1.2. |
| aud | Audience | M | 1 | This IE shall contain the NF service producer's NF instance ID(s) (if the exact NF instance(s) of the NF service producer is known) or the NF type of NF service producers for which the claim is applicable, corresponding to the standard "Audience" claim described in IETF RFC 7519 [25], clause 4.1.3. |
| scope | string | M | 1 | This IE shall contain the name of the NF services and the resource/operation-level scopes for which the access_token is authorized for use; this claim corresponds to a private claim, as described in IETF RFC 7519 [25], clause 4.3.<br><br>pattern: '^([a-zA-Z0-9 :-]+)([a-zA-Z0-9_:-]+)*$' |
| exp | integer | C | 0..1 | This IE shall contain the expiration time after which the access_token is considered to be expired, corresponding to the standard "Expiration Time" claim described in IETF RFC 7519 [25], clause 4.1.4. |
| consumerPlmnId | PlmnId | C | 0..1 | This IE shall be included if the NRF supports providing PLMN ID of the NF service consumer in the access token claims, to be interpreted for subject (sub IE), as specified in clause 13.4.1.2 of 3GPP TS 33.501 [15]. If an NF service producer that receives this IE in the token included in the authorization header does not understand this IE, it shall be ignored. |

FIG. 2I

| | | | | |
|---|---|---|---|---|
| producerPlmnId | PlmnId | C | 0..1 | This IE shall be included if the NRF supports providing PLMN ID of the NF service producer in the access token claims, to be interpretted for audience (aud IE), as specified in clause 13.4.1.2 of 3GPP TS 33.501 [15]. If an NF service producer that receives this IE in the token included in the authorization header does not understand this IE, it shall be ignored. |
| producerSnssaiList | array(Snssai) | O | 1..N | This IE may be included if the NRF supports providing list of S-NSSAIs of the NF service producer in the access token claims. If an NF service producer that receives this IE in the token included in the authorization header does not understand this IE, it shall be ignored. |
| producerNsilist | array(string) | O | 1..N | This IE may be included if the NRF supports providing list of NSIs of the NF service producer in the access token claims. If an NF service producer that receives this IE in the token included in the authorization header does not understand this IE, it shall be ignored. |

FIG. 2J

| | | | | | |
|---|---|---|---|---|---|
| producerNfSetId | NfSetId | O | 0..1 | This IE may be included if the NRF supports providing NF Set ID of the NF service producer in the access token claims and if the audience contains an NF type. When present, it shall indicate the NF Set ID of the NF service producer instances for which the claim is applicable. If an NF service producer that receives this IE in the token included in the authorization header does not understand this IE it shall be ignored. | |
| SatMobility | Boolean | C | 0..1 | True or false to indicate that the requester NF service consumer is in Satellite | IE N |

FIG. 2K

METHODS AND RELATED APPARATUSES FOR EXTENDING AN EXPIRATION TIME PERIOD OF A TELECOMMUNICATIONS ACCESS TOKEN

TECHNICAL FIELD

This disclosure is related to the field of mobile communication networks, in particular a mobile network that includes a constellation of low density, low-earth orbit (LEO) satellite constellations.

INTRODUCTION

This section introduces aspects that may help facilitate a better understanding of the inventive disclosure. Accordingly, the statements in this section are to be read in this light and are not to be understood as admissions about what is, or what is not, prior art.

Referring now to FIG. 1, there is depicted an exemplary mobile communications network 1. The network 1 may comprise one or more low-density, LEO satellites 2*a* to 2*n* that may form a constellation 3. The network 1 may also comprise one or more ground stations 4*a* to 4*n* that may be connected to one or more Mobile Network Operator (MNOs), core networks 5*a* to 5*n* and one or more user equipment (UE) 6*a* to 6*n*.

To illustrate the issue solved by the present disclosure, we will (for now) discuss a single core network 5*a*, single ground station 4*a* and single UE 6*a* but this is merely exemplary. It should be understood that our discussion applies to each core network 5*a* to 5*n*, ground station 4*a* to 4*n* and UE 6*a* to 6*n*.

In embodiments, the UE 6*a* may comprise an Internet-of-Things (IoT) compatible device, such as a mobile phone, laptop computer, personal computer, electronic server, household-appliance, and industrial device to name just a few non-limiting examples of UE 6*a*. Further, the UE 6*a* may comprise a plurality of electronic components 11*a* to 11*n* (where "n" indicates a last component), such as (i) front end electronic circuitry 11*a* that is operable to complete narrowband Internet of Things (NB IoT) compliant processes in order to connect to constellation 3, (ii) connection management element 11*b* operable to manage connective, idle and (extended) sleep cycles of the UE 6*a* based on the computed positions and velocities (and/or various derived quantities such as right ascension and declination) of satellites 2*a* to 2*n* at specific times (i.e., satellite ephemeris), and (iii) an IoT application element operable to generate and receive "use case" specific, user data messages.

In an embodiment, ground station 4*a* may comprise an independent core network that comprises a plurality of elements 12*a* to 12*n* that may (or may not) have a roaming relation with MNO core network 5*a*. The ground station may function 4*a* as a network interface between the constellation 3 and the MNO core network 5*a*. In embodiments, the 12*a* to 12*n* may comprise network resource function (NRF) element 12*a*, and one or more network function (NF) circuits 12*b* compatible with fifth generation core network (5GC) capabilities of a mobile telecommunications network (e.g., selected from at least unified data management (UDM) element, authentication server function (AUSF) element and Session Mobility function (SMF) element).

MNO core network 5*a* may comprise one or more types of elements 7*a* to 7*n*, 13*a* to 13*n* and 14 that enables mobile communications for UE 2*a* over a specific geographic area. In FIG. 1, the elements are Packet Data Network Gateway (PGW) 7*a*, Home Subscriber Server (HSS) 7*b*, IoT service platforms 7*c*, and one or more Network Resource Function (NRF) elements 13*a* to 13*n* (where "n" indicates the last NRF element) and one or more network Function (NF) elements 14 of one or more Public Land Mobile Networks (PLMNs) though it should be understood that the core network 5*a* may comprise a plurality of additional telecommunications equipment.

Turning to the low-density, LEO satellite constellation 3, in embodiments the satellites 2*a* to 2*n* may pass over the geographical position where the UE 6*a* and ground station 4*a* are located every few hours or days (so-called "revisit time"). However, the duration during which satellites 2*a* to 2*n* may be visible to a specific UE or ground location, for example, visible to UE 6*a* or ground station 4*a* may be relatively short. In an embodiment, the duration during which satellites 2*a* to 2*n* may be visible to UE 6*a* or ground station 4*a* may be in the order of minutes (i.e., a few minutes to several minutes) before the satellites 2*a* to 2*n* move out of sight of UE 6*a* and/or ground station 4*a*. Accordingly, in embodiments the window of time during which UE 6*a* and/or ground station 4*a* may establish communications with satellites 2*a* to 2*n* is relatively short compared to the revisit time (so-called "visibility window"). Such exemplary revisit times and visibility windows may be advantageous for applications that require frequent monitoring, data collection, or communication services, such as earth observation, remote sensing, Internet of Things (IoT) connectivity, or real-time data transmission. However, such short visibility windows provide certain challenges for establishing and maintaining mobile communications between the UE 6*a* and MNO 5*a*.

For example, during such a short visibility window the components of the network 1 must establish and maintain communications, for example, exchanging both Mobile-Originated (MO), delay tolerant traffic via service telecommunications link 9 ("service link", e.g., NTN, wireless, Narrowband Internet of Things (NB-IoT) service link for providing NTN, NB-IoT communications) and Mobile-Terminated (MT), delay tolerant traffic via a discontinuous feeder telecommunications link 10 ("feeder link"). While such a link 10 may be advantageous to optimize the utilization of resources of satellites 2*a* to 2*n* and/or improve efficiencies, as the name implies, communications over the discontinuous feeder telecommunications link 10 may not be continuous, i.e., the transmission or reception of data may be interrupted (e.g., periodically interrupted).

Realizing that a mobile network 1 may include a discontinuous feeder link 10 and may be subject to limited visibility windows some satellites 2*a* to 2*n* may include non-terrestrial network (NTN) communications equipment 8 that address some of the challenges.

For example, the equipment 8 may comprise electronic interface element 8*a* (e.g., an Evolved NodeB (eNB) element for 4G Long term Evolution (LTE) networks or a "Next Generation NodeB or "gNB" element for 5G networks), (ii) signal processing element 8*b*, (iii) electronic regeneration element (not shown) and (iv) electronic store and forward element 8*c*. In particular, the electronic signal processing element 8*b* may include elements that perform access and mobility management functions (AMF) (hereafter referred to as "AMF element") while the electronic store and forward element may temporarily store received signals (e.g., non-real time communication signals that comprise delay tolerant traffic), and then transmit or forward the non-real time communication signals that comprise delay tolerant traffic (e.g., data) at a higher power, for example, or at specific intervals to the ground station 4*a*.

While these features overcome some of the challenges, others still need to be addressed. For example, to complete certain processes (e.g., AMF based processes) required to establish and maintain communications between the UE 2*a* and ground station 4*a* or MNO 5*a* the NRF element at the ground station 4*a* and/or at the MNO 5*a* must generate a digital "access token" that may be exchanged with the AMF element onboard a satellite 2*a*. The access token functions as evidence or "proof" of a particular network element's identity and permissions as those relate to the network 1. To establish and/or maintain communications with other elements of the network 1, the access token associated with the particular element must be included in subsequent messages exchanged between the particular element and other elements of the network 1.

However, existing telecommunications networks that are designed in accordance with industry standards (e.g., TS 29.510) generate access tokens that have short expiration time periods (5-10 mins). Such, short expiration time periods do not allow a satellite 2*a* with onboard elements for completing AMF features and functions to complete such features and functions before the access token expires. As a result, new access tokens must be repeatedly generated, only to expire before AMF features and functions are completed.

Accordingly, it is desirable to provide solutions that alleviate the challenges just described by providing for the extension or enlargement of the expiration time period of an access token used in such a mobile network (collectively "extending"" or extension).

SUMMARY

The present disclosure sets forth exemplary methods and related devices for extending an expiration time period of an access token used in a mobile network that includes a satellite with onboard store and forward elements and elements that complete AMF features and functions (i.e., an AMF element). In particular, exemplary methods and related apparatuses for increasing the expiration time period of an access token beyond time periods that are typically used are described.

In one exemplary embodiment, a method for extending the expiration time period of a telecommunications access token may comprise: receiving a first message from an AMF element of a satellite at a network resource function (NRF) element of a ground station, where the first message comprises at least a first information element (IE) indicating that the satellite comprises the AMF element and an enhanced Transport Layer security (TLS) certificate that further comprises at least one satellite indication; determining, by the NRF element, that features of the AMF element can be allowed at the satellite and can be used by the ground station based on the at least one satellite indication in the TLS certificate; receiving, at the NRF element, a second message from the satellite, where the second message comprises a second IE indicating that the features of the AMF element are deployed at the satellite; generating an authorization message by the NRF element, the authorization message comprising a generated, digitally signed access token with at least one extended expiration time period and at least one second satellite indication that acknowledges the satellite comprises the AMF element; and sending, from the NRF element, the authorization message comprising the generated, digitally signed access token that comprises the at least one extended expiration time period and the at least one second satellite indication to the AMF element.

The exemplary method may further comprise: receiving, at a Network Function (NF) element of the ground station, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication; and validating the request message at the NF element.

In this embodiment the at least one extended expiration time period may comprise an extended expiration time period of up to 48 hours, while the NF element may comprise one or more NF elements of a fifth generation core network (5GC) of a mobile telecommunications network (e.g., one or more elements selected from at least a unified data management (UDM) element, authentication server function (AUSF) element and Session Mobility Function (SMF) element).

Yet further, the exemplary method may comprise sending data from the NF element to the AMF element.

In a second embodiment a method for extending the expiration time period of a telecommunications access token may comprise: sending a first message from an AMF element of a satellite to a NRF element of a ground station, where the first message comprises at least a first IE indicating that the satellite comprises the AMF element and an enhanced TLS certificate that further comprises at least one satellite indication; sending a second message from the AMF element to the NRF element, where the second message comprises a second IE indicating that features of the AMF element are deployed at the satellite; receiving, at the AMF element, an authorization message comprising a generated, digitally signed access token comprising at least one an extended expiration time period and at least one second satellite indication that acknowledges the satellite comprises the AMF element from the NRF element; and sending a request message, the generated, digitally signed access token that comprises the at least one extended time period and the at least one second satellite indication from the AMF element to a NF element of the ground station, the request message comprising a request that the NF element utilize the generated, digitally signed access token comprising the at least one extended expiration time period and the at least one second satellite indication.

Again, in this embodiment the at least one extended expiration time period may comprise an extended expiration time period of up to 48 hours, while the NF element may comprise one or more NF elements of a 5GC of a mobile telecommunications network (e.g., one or more elements selected from at least a UDM element, AUSF element and a SMF element).

Still further, in this embodiment the method may further comprise receiving data from the NF element at the AMF element.

In a third embodiment, a method for extending the expiration time period of a telecommunications access token may comprise: receiving a first message from an AMF element of a satellite at a first NRF element of a first public land mobile network (PLMN), where the first message comprises at least a first IE indicating that the satellite comprises the AMF element and an enhanced TLS certificate that further comprises at least one satellite indication; determining, by the first NRF element, that features of the AMF element can be allowed at the satellite and can be used by the first PLMN based on the at least one satellite indication in the TLS certificate; receiving, at the first NRF element, a second message from the AMF element, where the second message comprises a second IE indicating that features of the AMF element are deployed at the satellite; generating a first authorization message by the first NRF element, the first authorization message comprising a first indication that the AMF element is authorized to use a generated, digitally signed access token comprising at least one extended expiration time period and the at least one satellite indication; sending the first authorization message and the at least one satellite indication to second NRF element of a second PLMN; determining, by the second NRF element, that features of the AMF element can be allowed at the satellite and can be used by the second PLMN based on the at least one satellite indication; generating a second authorization message by the second NRF element, the second authorization message comprising a second indication that the AMF element is authorized to use the generated, digitally signed access token comprising the at least one extended expiration time period and at least one second satellite indication; sending, from the second NRF element, the second authorization message comprising the generated, digitally signed access token that comprises the at least one extended expiration time period and the at least one second satellite indication to the first NRF element; sending, from the first NRF element to the AMF element, a third authorization message that authorizes the AMF element to utilize the generated, digitally signed access token that comprises the at least one extended expiration time period and the at least one second satellite indication; and, optionally, sending data from an NF element to the AMF element of the second PLMN.

The exemplary method may further comprise receiving, at the NF element, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication; and validating the request message at the NF element.

Further, it should be noted that the above-referenced at least one extended expiration time period may comprise an extended expiration time period of up to 48 hours, while the NF element may comprise one or more NF elements of a 5GC of a mobile telecommunications network (e.g., the one or more NF elements may be selected from at least a UDM element, AUSF element and a SMF element).

In a fourth embodiment, a method for extending the expiration time period of a telecommunications access token may comprise: sending a first message from an AMF element of a satellite to a first NRF element of a first PLMN, where the first message comprises at least a first IE indicating that the satellite comprises the AMF element and an enhanced TLS certificate that further comprises at least one satellite indication; sending, to the first NRF element, a second message from the AMF element, where the second message comprises a second IE indicating that features of the AMF element are deployed at the satellite; receiving, at the AMF element, an authorization message that comprises a generated, digitally signed access token that comprises at least one extended expiration time period and at least one second satellite indication from the first NRF element; and sending, from the AMF element, to a NF element of the second PLMN, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication.

As before, in this embodiment the at least one extended expiration time period may comprise an extended expiration time period of up to 48 hours.

Further, the NF element may comprise one or more NF elements of a 5GC of a mobile telecommunications network (e.g., the one or more NF elements may be selected from at least a UDM element, AUSF element and a SMF element).

This fourth embodiment may further comprise receiving data from the NF element at the AMF element.

In addition to the exemplary methods described herein the disclosure also provides for an apparatus (e.g., system, device) that may comprise one or more telecommunication elements for extending the expiration time period of a telecommunications access token. For example, in one embodiment one of the telecommunications elements may comprise an NRF element of a ground station comprising at least one processor, and at least one memory storing instructions that, when executed by the at least one processor, cause the NRF element to: receive a first message from an AMF element of a satellite, where the first message comprises at least a first IE indicating that the satellite comprises the AMF element and an enhanced TLS certificate that further comprises at least one satellite indication; determine that features of the AMF element can be allowed at the satellite and can be used by the ground station based on the at least one satellite indication in the TLS certificate; receive a second message from the satellite, where the second message comprises a second IE indicating that the features of the AMF element are deployed at the satellite; generate an authorization message comprising a generated, digitally signed access token with at least one extended expiration time period and at least one second satellite indication that acknowledges the satellite comprises the AMF element; send the authorization message comprising the generated, digitally signed access token that comprises the at least one extended expiration time period and the at least one second satellite indication to the AMF element; and optionally, send data to the AMF element.

Further, the one or more telecommunications elements may comprise a NF element comprising at least one processor, and at least one memory storing instructions that, when executed by the at least one processor, cause the NF element to: receive a request message from the AMF element, where request message comprises a generated, digitally signed access token that comprises the at least one extended expiration time period and at least one second satellite indication, the request message requesting that the NF element utilize the generated, digitally signed access token that comprises the at least one extended expiration time period and the at least one second satellite indication; and validate the request message.

In this embodiment, the at least one extended expiration time period may comprise an extended expiration time period of up to 48 hours, and the NF element may comprise one or more NF elements of a 5GC of a mobile telecommunications network (e.g., one or more NF elements selected from at least a UDM element, AUSF element and a SMF element).

In another embodiment, an apparatus (e.g., system, device) may comprise a telecommunication element for extending the expiration time period of a telecommunications access token. For example, the telecommunications element may comprise an AMF element at a satellite. In an embodiment, the AMF element may comprise at least one processor, and at least one memory storing instructions that, when executed by the at least one processor, cause the AMF element to: send a first message to an NRF element of a ground station, where the first message comprises at least a first IE indicating that the satellite comprises the AMF element and an enhanced TLS certificate that further comprises at least one satellite indication; send a second message to the NRF element, where the second message comprises a second IE indicating that features of the AMF element are deployed at the satellite; receive an authorization message comprising a generated, digitally signed access token comprising at least one extended expiration time period and at least one second satellite indication that acknowledges the satellite comprises the AMF element from the NRF element; sends a request message to a NF element of the ground station, the request message comprising a generated, digitally signed access token that comprises the at least one extended time period and the at least one second satellite indication; and, optionally receiving data from the NF element.

In this embodiment, the request message comprises a request that the NF element utilize the generated, digitally signed access token comprising the at least one extended expiration time period, and the at least one second satellite indication.

Similar to the embodiments above, in this embodiment the at least one extended expiration time period may comprise an extended expiration time period of up to 48 hours, and the NF element may comprise one or more NF elements of a 5GC of a mobile telecommunications network (e.g., the one or more NF elements may be selected from at least a UDM element, an AUSF element and a SMF element).

Another embodiment may comprise an apparatus (e.g., system, device) that comprises one or more telecommunication elements for extending the expiration time period of a telecommunications access token, where one of the elements may comprise a first NRF element of a first PLMN. In an embodiment, the first NRF element may comprise at least one processor, and at least one memory storing instructions that, when executed by the at least one processor, cause the first NRF element to: receive a first message from an AMF element of a satellite, where the first message comprises at least a first IE indicating that the satellite comprises the AMF element and an enhanced TLS certificate that further comprises at least one satellite indication; determine that features of the AMF element can be allowed at the satellite and can be used by the first PLMN based on the at least one satellite indication in the TLS certificate; receive a second message from the AMF element, where the second message comprises a second IE indicating that features of the AMF element are deployed at the satellite; generate a first authorization message comprising a first indication that the AMF element is authorized to use a generated, digitally signed access token comprising at least one extended expiration time period and the at least one satellite indication; send the first authorization message and the at least one satellite indication to a second NRF element of a second PLMN.

As will be discussed further herein, eventually the first NRF element will generate and send a third authorization message to the AMF element. In an embodiment the third authorization message authorizes the AMF element to utilize the generated, digitally signed access token that comprises the at least one extended expiration time period, and at least one second satellite indication.

Further, in this embodiment the one or more telecommunications elements may comprise a second NRF element, where the second NRF element may comprise at least one processor, and at least one memory storing instructions that, when executed by the at least one processor, cause the second NRF element to: determine that features of the AMF element can be allowed at the satellite and can be used by the second PLMN based on the at least one satellite indication; generate a second authorization message comprising a second indication that the AMF element is authorized to use the generated, digitally signed access token comprising the at least one extended expiration time period and at least one second satellite indication; send the second authorization message comprising the generated, digitally signed access token that comprises the at least one extended expiration time period and the at least one second satellite indication to the first NRF element.

Still further, the one or more telecommunications elements may comprise an NF element of the second PLMN. In an embodiment, the NF element may comprise at least one processor, and at least one memory storing instructions that, when executed by the at least one processor, cause the NF element to receive a request message from the AMF element, where the request message comprises the generated, digitally signed access token that comprises the at least one extended expiration time period and the at least one second satellite indication. In an embodiment the request message requests that the NF element utilize the generated, digitally signed access token that comprises the at least one extended expiration time period and the at least one second satellite indication. The processor may further cause the NF element to validate the request message, and optionally, send data to the AMF element.

In this embodiment, the at least one extended expiration time period may comprise an extended expiration time period of up to 48 hours and the NF element may comprise one or more NF elements of a 5GC mobile telecommunications network (e.g., one or more NF elements selected from at least a UDM element, an AUSF element and a SMF element).

Yet another embodiment, an apparatus (e.g., system, device) may comprise an exemplary telecommunication element for extending the expiration time period of a telecommunications access token. For example, the telecommunications element may comprise an AMF element at a satellite, where the AMF element may comprise at least one processor, and at least one memory storing instructions that, when executed by the at least one processor, cause the AMF element to: send a first message to a first NRF element of a first PLMN, where the first message comprises at least a first IE indicating that the satellite comprises the AMF element and an enhanced TLS certificate that further comprises at least one satellite indication; send a second message to the first NRF element, where the second message may comprise a second IE indicating that features of the AMF element are deployed at the satellite; receive an authorization message that comprises a generated, digitally signed access token that comprises at least one extended expiration time period and at least one second satellite indication from the first NRF element; send to an NF element of the second PLMN, a request message; and optionally, receive data from the NF element.

In this embodiment the request message may comprise the generated, digitally signed access token that comprises the at least one extended expiration time period and the at least one second satellite indication. Further, the request message may request that the NF element utilize the generated, digitally signed access token that comprises the at least one extended expiration time period and the at least one second satellite indication.

Similar to the other embodiments, in this embodiment the at least one extended expiration time period may comprise an extended expiration time period of up to 48 hours, and the NF element may comprise one or more NF elements of a 5GC mobile telecommunications network (e.g., the one or more NF elements may be selected from at least a UDM element, an AUSF element and a SMF element).

BRIEF DESCRIPTION OF THE DRAWINGS

The present invention is illustrated by way of example and is not limited by the accompanying figures in which like reference numerals indicate similar elements and in which:

FIGS. 2A to 2K depict exemplary lists of Information Elements ("IEs") including some innovative, inventive IEs provided by the present disclosure.

Figure 1:
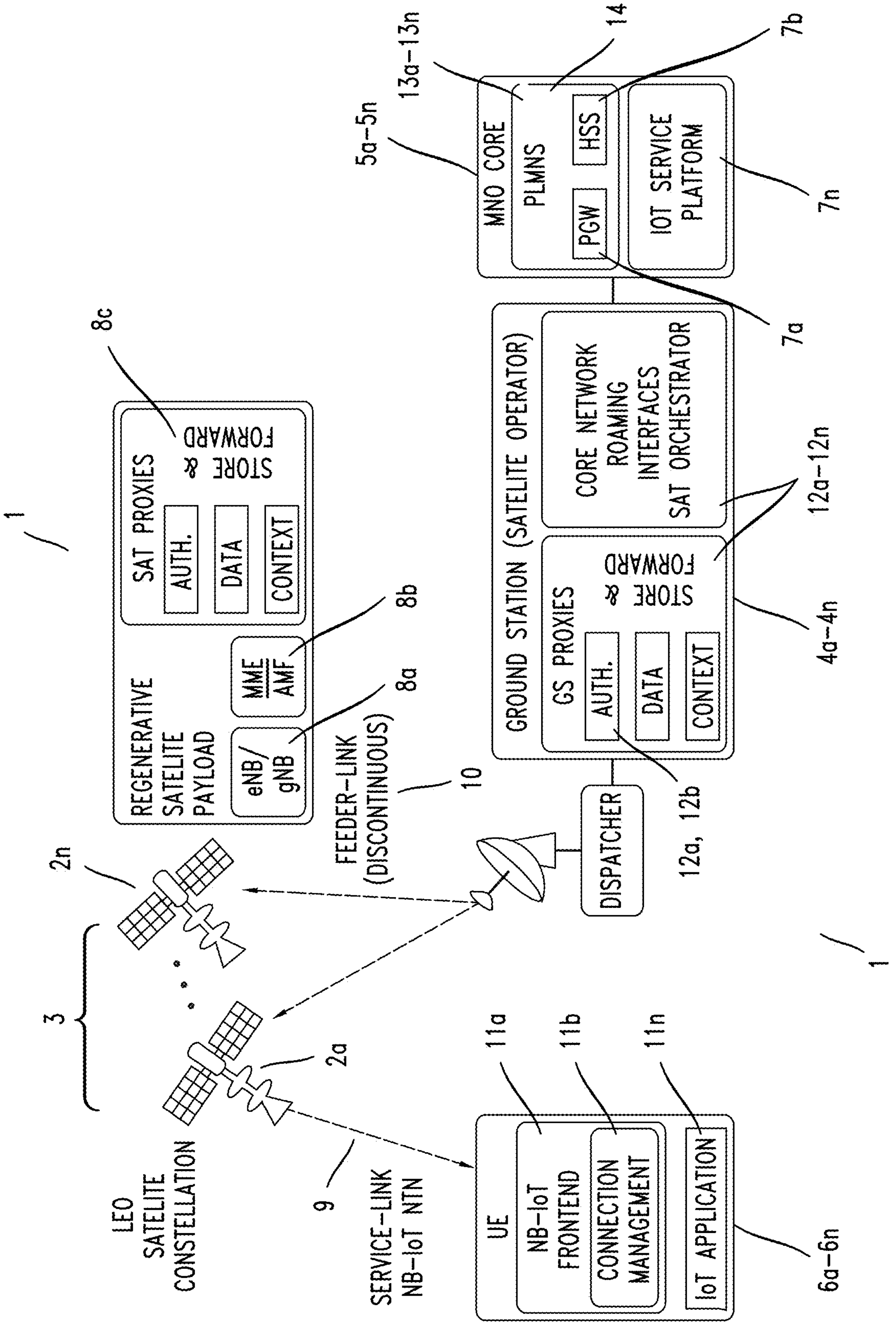
FIG. 1 depicts an exemplary mobile communications network according to the present disclosure.

Specific embodiments of the present invention are disclosed below with reference to various figures and sketches. Both the description and the illustrations have been drafted with the intent to enhance understanding. For example, the block diagram in FIG. 1 is not representative of actual devices or apparatuses, Instead, it is set forth to explain features of the inventive methods and apparatuses.

Simplicity and clarity in both illustration and description are sought to effectively enable a person of skill in the art to make, use, and best practice the exemplary embodiments described herein in view of what is already known in the art. One skilled in the art will appreciate that various modifications and changes may be made to the specific embodiments described herein without departing from the spirit and scope of the present disclosure. Thus, the text and figures are to be regarded as illustrative and exemplary rather than restrictive or all-encompassing, and all such modifications to the specific embodiments described herein are intended to be included within the scope of the present disclosure.

DETAILED DESCRIPTION OF EXEMPLARY EMBODIMENTS

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

As used herein and in the appended claims, the term "comprises," "comprising," or variations thereof are intended to refer to a non-exclusive inclusion, such that a process, method, article of manufacture, or apparatus that comprises a list of elements does not include only those elements in the list but may include other elements not expressly listed or inherent to such process, method, article of manufacture, or apparatus.

The terms "a" or "an", as used herein, are defined as one, or more than one. The term "plurality", as used herein, is defined as two, or more than two. The term "another", as used herein, is defined as at least a second or more.

Unless otherwise indicated herein, the use of relational terms, if any, such as "first" and "second", and the like are used solely to distinguish one function, process, or set of executable instructions from another function, process, or set of executable instructions without necessarily requiring or implying any actual such relationship, order or importance between such functions, processes, or sets of executable instructions.

The terms "including" and/or "having", as used herein, are defined as comprising (i.e., open language).

In the figures, similar reference characters denote similar features consistently throughout the attached drawings.

The term "or" is used herein in both the alternative and conjunctive sense, unless otherwise indicated.

The terms "illustrative" and "exemplary" are used to be examples with no indication of quality level.

As used herein, the term "data" and similar terms means information capable of being transmitted, received and/or stored in accordance with certain embodiments of the present disclosure.

As used herein the term "user equipment" or UE" refers to an apparatus that includes, among other things, electronic elements (e.g., a modem) that function as a radio frequency transceiver to wirelessly (i) transmit signals, messages and data to one or more elements (e.g., devices, apparatuses) of a mobile telecommunications network using an air interface and (ii) receive signals, messages and data from the one or more elements of the network using the air interface.

As used herein, the term "telecommunication element", "element" or the plural form "telecommunication elements", "elements" refers to (a) electronic hardware-only circuit implementations (e.g., implementations in analog circuitry and/or digital circuitry); and/or (b) combinations of electronic circuits and computer program product(s) comprising software and/or firmware instructions stored on one or more electronic memories that work together to cause an apparatus to perform one or more functions or process steps described herein; and/or (c) electronic circuits, such as, for example, an electronic microprocessor(s), a portion of a microprocessor(s), processor, portion of a processor, electronic integrated circuit or electronic applications processor (collectively referred to herein as "processor") that executes stored instructions (e.g., software or firmware) retrieved from at least one electronic memory that, when executed by the processor cause an apparatus or the element itself to perform one or more features, functions or steps in a process or method. As used herein the words "telecommunication element" and "element" may be used interchangeably herein.

As used herein, the phrase electronic "memory" (referred to as "memory" herein) means a non-transitory, electronic storage medium (e.g., volatile or non-volatile memory device). Examples of non-transitory, electronic storage media include, but are not limited to: a random access memory (RAM); a programmable read only memory (PROM); an erasable programmable read only memory (EPROM); a FLASH-EPROM; a magnetic computer readable medium (e.g., a floppy disk, hard disk, magnetic tape, any other magnetic medium); an optical computer readable medium (e.g., a compact disc read only memory (CD-ROM); a digital versatile disc (DVD); a Blu-Ray disc (BD), the like, or combinations thereof), or any other non-transitory medium from which an electronic processor can retrieve stored instructions that when executed cause an apparatus to perform one or more functions or steps in a process.

As will be described in more detail herein, to extend (i.e., increase) the expiration time period of an access token used in a mobile network that includes a satellite with onboard store and forward and AMF elements requires a plurality of inventive innovations.

In particular, telecommunications standards that govern such a mobile network should be revised. One such standard is known as TS 29.510. In general, this standard focuses on the policy and charging control architecture and interfaces for 5G mobile telecommunications networks, such as network 1 in FIG. 1.

More particularly, this standard describes a list of messages (referred to as "Information Elements" or "IE") that may be exchanged between elements of a mobile network, such as elements of network 1. Some of the IEs that make up this standard are shown in FIGS. 2A to 2F. In embodiments, innovative, inventive IE 1 to IE N (where "N" indicates a last innovative message; hereafter referred to as "IE 1 to IE N") are included in FIGS. 2A to 2F. As will be described in more detail herein, IE 1 to IE N should be added to innovative, inventive message flows exchanged between elements of a mobile network, such as elements of network 1.

As indicated previously, the electronic signal processing element 8*b* onboard satellite 2*a* may comprise AMF telecommunication element (where again "telecommunication element" comprises, for example, at least one processor and at least one memory for storing instructions that, when executed by the at least one processor, cause the an apparatus or the element itself at least to perform one or more functions or steps in process or method) while the ground station 4*a* may include NRF telecommunication element 12*a* and NF telecommunication element 12*b*.

We shall now discuss one embodiment of the present disclosure with respect to messages and data primarily exchanged between AMF element 8*b*, NRF element 12*a* and NF element 12*b* (among other elements of network 1) with respect to inventive message flow 100 in order to set the expiration time period of a telecommunications access token, though, again, this is merely exemplary and a similar method applies to AMF element(s) onboard one or more satellites 2*a* to 2*n*, and NRF element and NF element that may be a part of one or more ground stations 4*a* to 4*n*. In an embodiment, the message flow 100 in FIG. 3 represents a scenario that assumes there is no inter-PLMN signaling.

Figure 3:
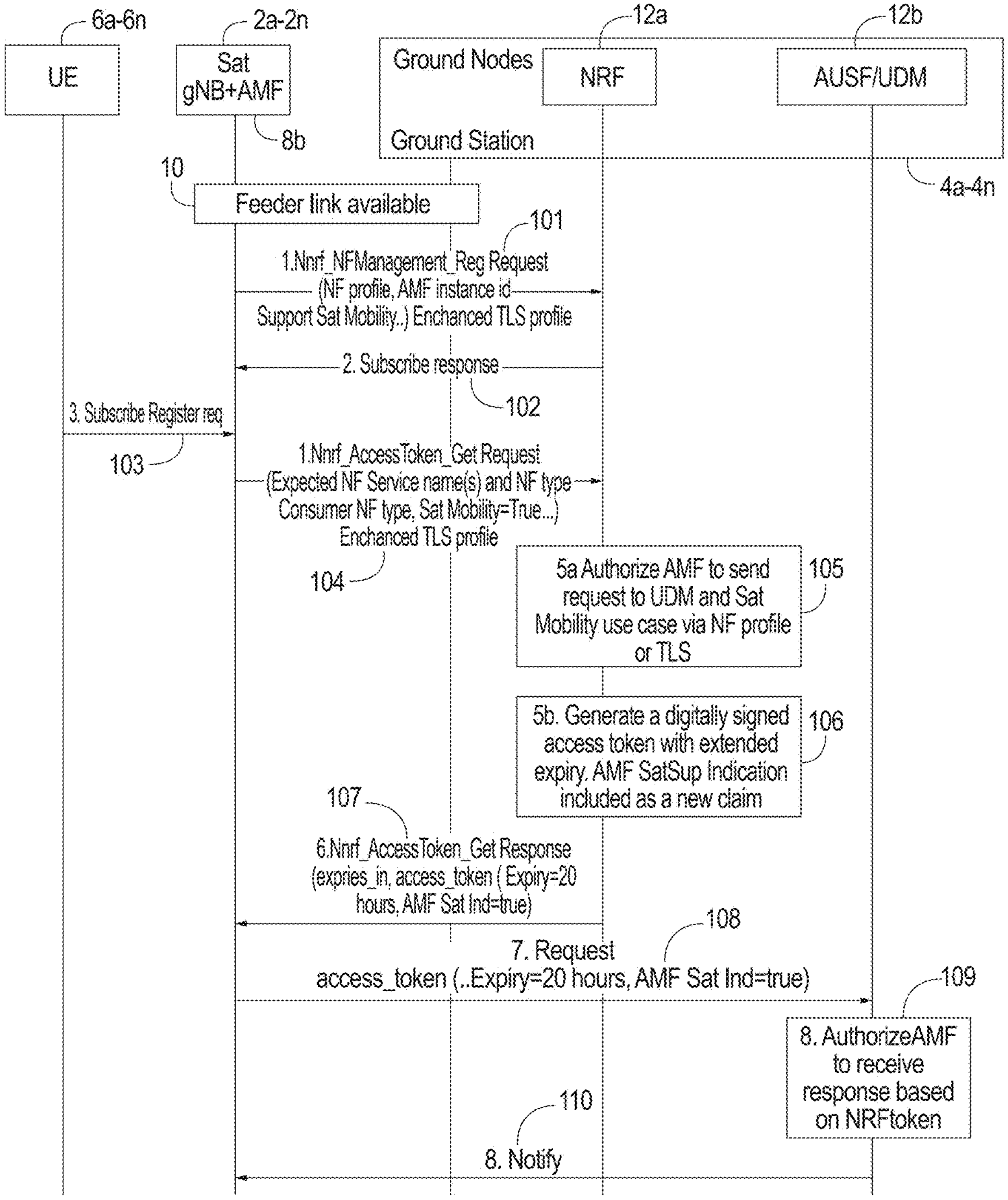
FIG. 3 depicts an exemplary message flow according to one exemplary non-roaming method provided by the present disclosure.

In accordance with exemplary method 100, during step 101 depicted in FIG. 3, AMF element 8*b* may generate and send a first message via feeder link 10 to NRF element 12*a*, where the first message comprises at least a first IE (e.g., IE 1 in FIG. 2B) indicating that the satellite comprises an AMF element capable of completing one or more AMF processes and/or an enhanced Transport Layer Security (TLS) certificate (e.g., enhancing the indication set forth in standard TS 33310). In an embodiment the TLS certificate may comprise at least one satellite indication.

Upon receiving the first message, the NRF element 12*a* may generate and send via feeder link 10 a response during step 102 to the AMF element 8*b* indicating, among other things, that it has received the first message from the AMF element 8*b*, where, again, the first message comprises the at least a first IE indicating that the satellite comprises the AMF element and the enhanced TLS certificate. The response may further comprise a "heart-beat timer" containing the number of seconds expected between two consecutive heart-beat messages from NF element 12*b* to NRF element 12*a*.

Optionally, or in addition to step 102, in an embodiment the NRF element 12*a* may determine whether (or not) features of the AMF element 8*b* will be allowed (e.g., AMF element 8*b* is permitted to provide 5GS services to UE 6*a* to 6*n*, among other requirements of standard TS 29510; see FIGS. 2A to 2K) and can be used by the ground station 4*a* based on the at least one satellite indication in the TLS certificate. Provided the features are allowed and can be used by the ground station 4*a*, the method 100 continues.

Upon receiving a message from UE 6*a* (e.g., a subscriber registration request) at the satellite 2*a* via service link 9 in step 103, the AMF element 8*b* may subsequently generate and send a second message to the NRF element 12*a* during step 104. In an embodiment, the second message may comprise a second IE indicating that features of the AMF element are deployed at the satellite (e.g., IE 2 in FIG. 2F).

In response, upon receiving the second message indicating that the features of the AMF element are deployed at the satellite, the NRF element 12*a* may generate an authorization message during step 105. In an embodiment, the authorization message may comprise a generated, digitally signed access token with at least one extended expiration time period and at least one second satellite indication that acknowledges the satellite 2*a* comprises onboard AMF element (e.g., IE 3 in FIG. 2G). For example, during step 106 the NRF element 12*a* may generate a digitally signed access token comprising at least one extended expiration time period, where the expiration time period may comprise an extended expiration time period of two to three minutes up to 48 hours. Thereafter, the NRF element 12*a* may send the authorization message comprising the generated, digitally signed access token that comprises the at least one extended expiration time period and the at least one second satellite indication to the AMF element 8*b* during step 107.

Upon receiving the authorization message comprising the generated, digitally signed access token that comprises at least one an extended expiration time period and the at least one second satellite indication that acknowledges the satellite 2*a* comprises onboard AMF element from the NRF element 12*b*, AMF element 8*b* may generate and send a request message, the generated, digitally signed access token that comprises the at least one extended time period and the at least one second satellite indication to the NF element 12*b* (e.g., IE N in FIG. 22K) during step 108. In an embodiment, the request message may comprise a request that the NF element 12*b* utilize the generated, digitally signed access token comprising the at least one extended expiration time period and the at least one second satellite indication.

In embodiments, the NF element 12*b* may comprise one or more NF circuits of a fifth generation core network (5GC) of a mobile telecommunications network. For example, the one or more NF circuits may be selected from a non-limiting list of telecommunication elements, such as at least a unified data management (UDM) telecommunication element, an authentication server function (AUSF) telecommunication element and a Session Mobility Function (SMF) telecommunication element, to name just a few types of NF telecommunication elements 12*b*.

Continuing, upon receiving the a request message, the generated, digitally signed access token that comprises the at least one extended expiration time period and the at least one second satellite indication at the NL element 12*b* (where, again, the request message requests that the NF element 12*b* utilize the generated, digitally signed access token that comprises the at least one extended expiration time period and the at least one second satellite indication), the NL element 12*b* may validate the request during step 109 (i.e., the NF element 12*b*, such as an AUSF or UDM, validates the request using a public key, for example).

Thereafter, the NL element 12*b* may send data (e.g., subscriber data stored in a UDM element) to the AMF element 8*b*, and the AMF element may receive such data during step 110.

We shall now discuss another embodiment of the present disclosure. Our discussion will include, primarily, messages and data exchanged between AMF telecommunication element 8*b*, NRF telecommunication elements that may be part of a PLMNs and an NF telecommunication element that may be part of a second PLMN (among other elements of network 1) with respect to inventive message flow 200 in FIGS. 4A and 4B in order to set the expiration time period of a telecommunications access token. Again, this is merely exemplary, and a similar method may be applied to AMF element onboard one or more satellites 2*a* to 2*n*, and NRF and NF elements that may be a part of one or more additional PLMNs. In an embodiment, the message flow 200 in FIGS. 4A and 4B represents a scenario that involves inter-PLMN signaling.

Figure 4A:
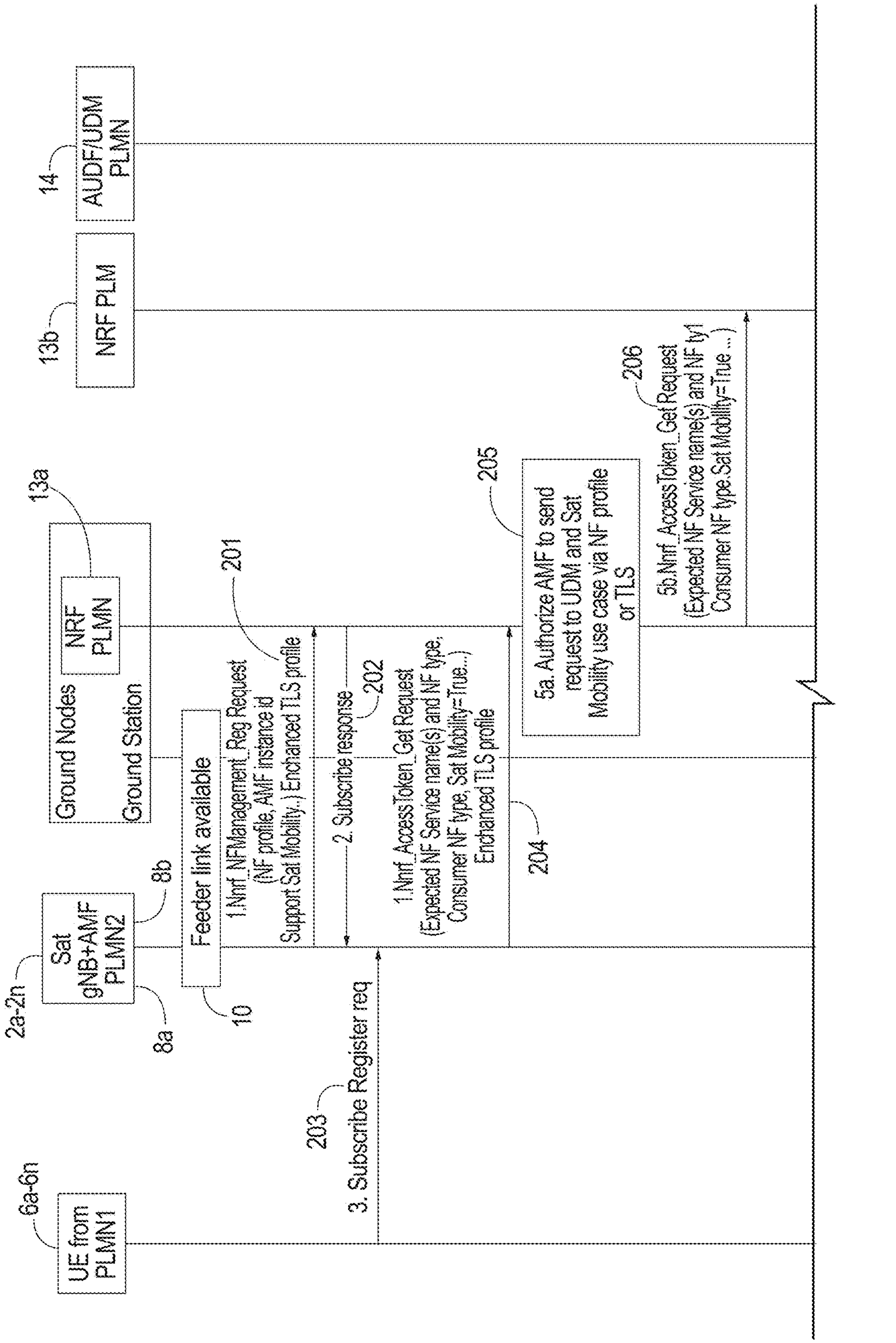
FIG. 4A to 4B depicts an exemplary message flow according to one exemplary roaming method provided by the present disclosure.
Figure 4B:
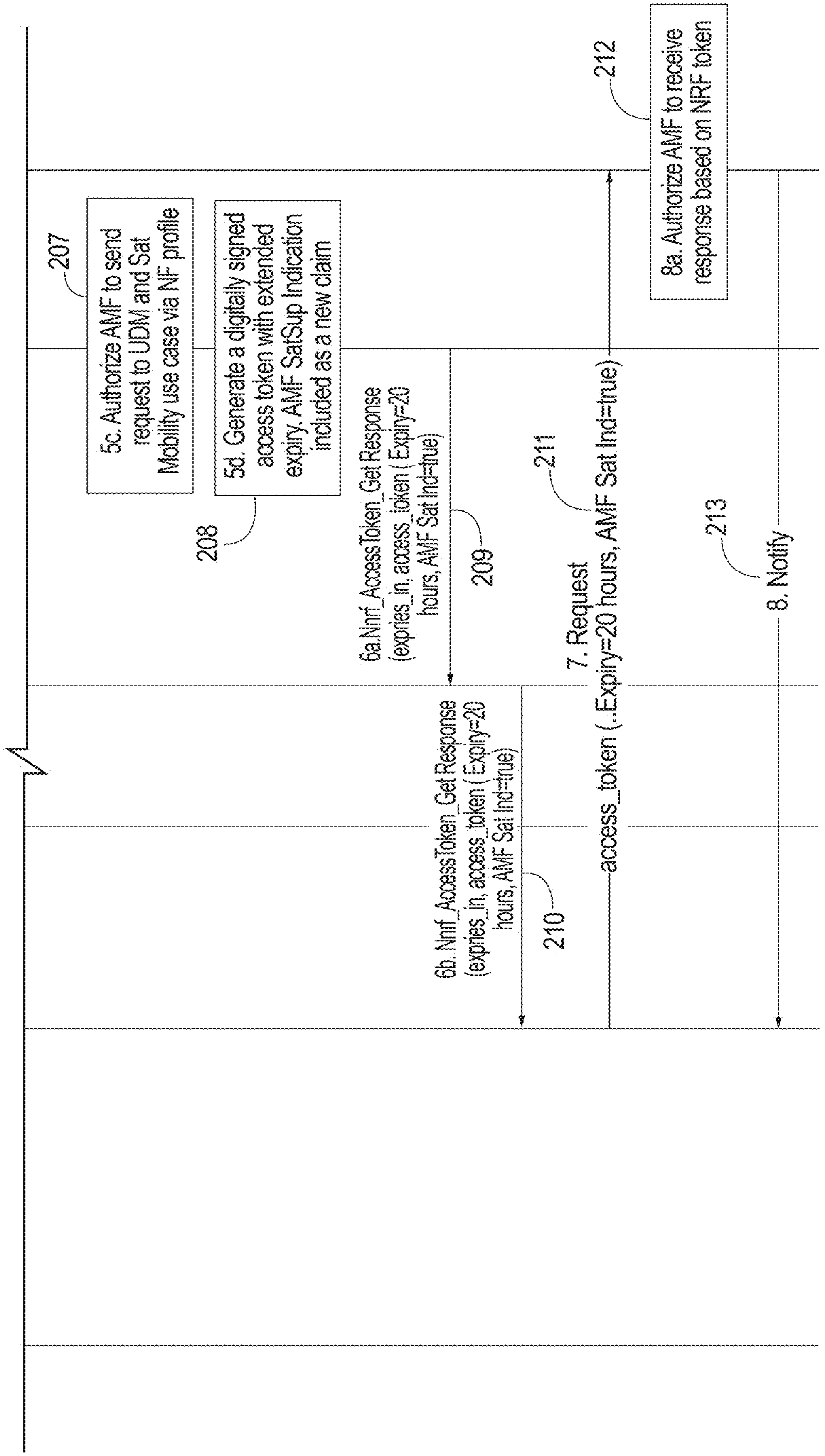

In accordance with exemplary method 200, during step 201 depicted in FIG. 4A, AMF element 8*b* may generate and send a first message via feeder link 10 to first NRF element 13*a* of a first PLMN, where the first message comprises at least a first IE (e.g., IE 1 in FIG. 2A) indicating that the satellite 2*a* comprises AMF element capable of completing one or more AMF processes and/or an enhanced TLS certificate (e.g., enhancing the indication set forth in standard TS 33310). In an embodiment the TLS certificate may comprise at least one satellite indication.

Upon receiving the first message, the first NRF element 13*a* may generate and send via feeder link 10 a response during step 202 to the AMF element 8*b* indicating, among other things, that it has received the first message from the AMF element 8*b*, where, again, the first message comprises the at least a first IE indicating that the satellite comprises the AMF element and the enhanced TLS certificate. The response may further comprise a "heart-beat timer" containing the number of seconds expected between two consecutive heart-beat messages from NF element 14 of a second PLMN and the first NRF element 13*a* of the first PLMN.

Optionally, or in addition to step 202, in an embodiment the first NRF element 13*a* may determine whether (or not) features of the AMF element 8*b* will be allowed (e.g., whether AMF element 8*b* is permitted to provide 5GS services to UE 6*a* to 6*n*, among other requirements of standard TS 29510; see FIGS. 2A to 22K) and can be used by the first PLMN based on the at least one satellite indication in the TLS certificate. Provided the features are allowed and can be used by the first PLMN, the method 200 continues.

Upon receiving a message from UE 6*a* (e.g., a subscriber registration request) at the satellite 2*a* via service link 9 in step 203, the AMF element 8*b* may subsequently generate and send a second message to the first NRF element 13*a* during step 204. In an embodiment, the second message may comprise a second IE indicating that features of the AMF element 8*b* are deployed at the satellite (e.g., IE 2 in FIG. 2F).

In response, upon receiving the second message indicating that the features of the AMF element are deployed at the satellite, the first NRF element 13*a* may generate a first authorization message comprising a first indication that the AMF element 8*b* is authorized to use a generated, digitally signed access token comprising at least one extended expiration time period and the at least one satellite indication during step 205. Thereafter, the first NRF element 13*a* may send the authorization message to the second NRF element 13*b* of the second PLMN during step 206.

Optionally, or as a part of step 207, upon receiving the first authorization message the second NRF element 13*b* may determine that features of the AMF element 8*b* can be allowed at the satellite and can be used by the second PLMN based on the at least one satellite indication.

Continuing, upon receiving the authorization message from the first NRF element 13*a*, the second NRF element 13*b* may generate a second authorization message. In an embodiment the second authorization message may comprise a second indication that the AMF element 8*b* is authorized to use a generated, access token comprising the at least one extended expiration time period, and at least one second satellite indication (e.g., IE N in FIG. 2K). In more detail, during step 208 the second NRF element 13*b* may generate a digitally signed access token comprising at least one extended expiration time period, where the expiration time period may comprise an extended expiration time period of two to three minutes up to 48 hours.

Thereafter, the second NRF element 13*b* may send the second authorization message comprising the generated, digitally signed access token that comprises the at least one extended expiration time period and the at least one second satellite indication to the first NRF element 13*a* during step 209.

Upon receiving the second authorization message from the second NRF element 13*b*, the first NRF element 13*a* may generate and send a third authorization message to the AMF element 8*b* during step 210. In an embodiment, the third authorization message authorizes the AMF element 8*b* to utilize the generated, digitally signed access token that comprises the at least one extended expiration time period and the at least one second satellite indication.

Upon receiving the authorization message that comprises a generated, digitally signed access token that comprises at least one extended expiration time period and at least one second satellite indication from the first NRF element 13*a* the AMF element 8*b* may generate and send to NF element 14 of the second PLMN, a request message during step 211. In an embodiment, the request message may comprise the generated, digitally signed access token that comprises the at least one extended expiration time period and the at least one second satellite indication (e.g., IE N in FIG. 2K). In an embodiment, the request message requests that the NF element 14 utilize the generated, digitally signed access token that comprises the at least one extended expiration time period and the at least one second satellite indication.

Similar to method 100, in method 200 the NF element 14 may comprise one or more NF circuits of a 5GC network that is part of a mobile telecommunications network (e.g., the one or more NF circuits may be selected from at least a UDM telecommunication element, AUSF telecommunication element and a SMF telecommunication element).

Upon receiving the request message which requests that the NF element 14 utilize the generated, digitally signed access token that comprises the at least one extended expiration time period and the at least one second satellite indication from the AMF element 8*b*, the NF element 14 may validate the request in step 212 and send data to the AMF element 8*b* in step 213, which may then be received by the AMF element 8*b* (i.e., the NF element 14, such as an AUSF or UDM element, validates the request using a public key, for example).

As discussed earlier, each of the telecommunication elements described herein may comprise an electronic processor that executes stored instructions (e.g., software or firmware) retrieved from at least one electronic memory that, when executed by the processor causes an apparatus (or the element itself) to perform one or more features, functions or steps in an exemplary process or method described herein.

Figure 5:
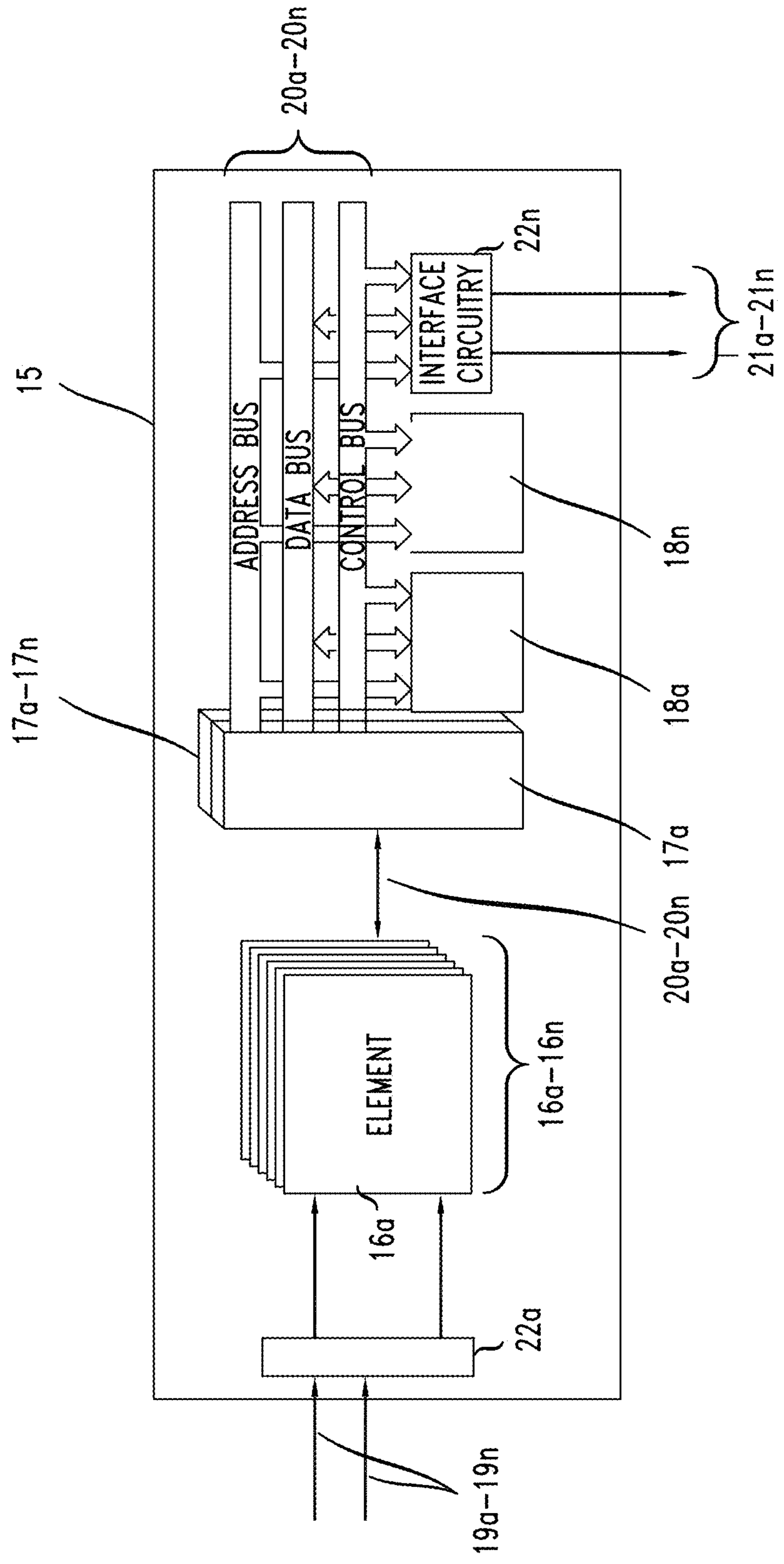
FIG. 5 depicts an exemplary apparatus for completing one or more features, functions and/or process steps of the present disclosure.

For example, FIG. 5 depicts an exemplary apparatus 15. The apparatus 15 may include one or more telecommunication elements 16*a* to 16*n*. In turn each of the elements 16*a* to 16*n* may comprise one or more electronic processors 17*a* to 17*n* and one or more electronic memories 18*a* to 18*n*, each of which may electronically store instructions and/or data. For the sake of illustration, only a single element 16*a*, single processor 17*a* and two memories 18*a*,18*n* will be discussed herein, though it should be understood that the apparatus 15 may comprise a plurality of telecommunication elements, and each element may comprise a plurality of processors and a plurality of memories.

In an embodiment, upon receiving signals (e.g., messages) and/or data via inputs 19*a* to 19*n* via input/output (I/O) circuitry 22*a* to 22*n*, telecommunication element 16*a* of apparatus 15 may forward the received signals and/or data to processor 17*a*. In an embodiment, processor 17*a* may electronically retrieve one or more stored instructions and/or data from memories 18*a*, 18*n*. Upon reception, and execution, of the instructions by the processor 17*a* the apparatus 15 (or element 16*a* itself) may be caused to perform one or more of the features, functions and/or process steps described herein and/or shown in the figures, including, but not limited to, generating or receiving signals (messages) and/or data that may be sent to, or received from, another element via electronic buses 20*a* to 20*n* or to/from another apparatus via outputs 21*a* to 21*n*, for example.

In some embodiments, certain ones of the methods, steps, processes, telecommunication elements and functions can be modified or further amplified. Furthermore, in some embodiments, additional optional methods, steps, processes, telecommunication elements, hardware, or the like, can be included.

Many modifications and other embodiments of the disclosure set forth herein will come to mind to one skilled in the art to which the disclosure pertains having the benefit of the teachings presented in the foregoing descriptions and the associated drawings. Therefore, it is to be understood that the present disclosure is not to be limited to the specific embodiments disclosed herein and that modifications and other embodiments are intended to be included within the scope of the appended claims.

Moreover, although the foregoing descriptions and the associated drawings describe certain example embodiments in the context of certain example combinations of elements, functions or steps, it should be appreciated that different combinations of elements, functions and/or steps can be provided by alternative embodiments without departing from the scope of the appended claims. In this regard, for example, different combinations of elements, functions and/or steps than those explicitly described above are also contemplated as can be set forth in some of the appended claims. Although specific terms may be employed herein, they are used in a generic and descriptive sense only and not for purposes of limitation.

The claim language that follows below is incorporated herein by reference in expanded form, that is, hierarchically from broadest to narrowest, with each possible combination indicated by the multiple dependent claim references described as a unique standalone embodiment.

Benefits, other advantages, and solutions to challenges have been described above with regard to specific embodiments of the present invention. However, the benefits, advantages, solutions to challenges, and any element(s), functions and/or steps that may cause or result in such benefits, advantages, or solutions, or cause such benefits, advantages, or solutions to become more pronounced are not to be construed as a critical, required, or essential feature or element of any or all the claims.

The invention claimed is:

1. A method for extending the expiration time period of a telecommunications access token comprising:

receiving a first message from an access and mobility management function (AMF) element of a satellite at a network resource function (NRF) element of a ground station, where the first message comprises at least a first information element (IE) indicating that the satellite comprises the AMF element and an enhanced Transport Layer security (TLS) certificate that further comprises at least one satellite indication;

determining, by the NRF element, that features of the AMF element can be allowed at the satellite and can be used by the ground station based on the at least one satellite indication in the TLS certificate;

receiving, at the NRF element, a second message from the satellite, where the second message comprises a second IE indicating that the features of the AMF element are deployed at the satellite;

generating an authorization message by the NRF element, the authorization message comprising a generated, digitally signed access token with at least one extended expiration time period and at least one second satellite indication that acknowledges the satellite comprises the AMF element; and sending, from the NRF element, the authorization message comprising the generated, digitally signed access token that comprises the at least one extended expiration time period and the at least one second satellite indication to the AMF element.

2. The method as in claim 1 further comprising:

receiving, at a Network Function (NF) element of the ground station, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication; and validating the request message at the NF element.

3. The method as in claim 1 wherein the at least one extended expiration time period comprises an extended expiration time period of up to 48 hours.

4. The method as in claim 2 wherein the NF element comprises one or more NF elements of a fifth generation core network of a mobile telecommunications network.

5. The method as in claim 4 wherein the one or more NF elements are selected from at least unified data management element, authentication server function element and Session mobility function element.

6. The method as in claim 2 further comprising sending data from the NF element to the AMF element.

7. A method for extending the expiration time period of a telecommunications access token comprising:

sending a first message from an access and mobility management function (AMF) element of a satellite to network resource function (NRF) element of a ground station, where the first message comprises at least a first information element (IE) indicating that the satellite comprises the AMF element and an enhanced Transport Layer Security indication (TLS) certificate that further comprises at least one satellite indication;

sending a second message from the AMF element to the NRF element, where the second message comprises a second IE indicating that features of the AMF element are deployed at the satellite;

receiving, at the AMF element, an authorization message comprising a generated, digitally signed access token comprising at least one an extended expiration time period and at least one second satellite indication that acknowledges the satellite comprises the AMF element from the NRF element; and sending a request message, the generated, digitally signed access token that comprises the at least one extended time period and the at least one second satellite indication from the AMF element to network function (NF) element of the ground station, the request message comprising a request that the NF element utilize the generated, digitally signed access token comprising the at least one extended expiration time period and the at least one second satellite indication.

8. The method as in claim 7 wherein the at least one extended expiration time period comprises an extended expiration time period of up to 48 hours.

9. The method as in claim 7 wherein the NF element comprises one or more NF elements of a fifth generation core network of a mobile telecommunications network.

10. The method as in claim 9 wherein the one or more NF elements are selected from at least unified data management element, authentication server function element and Session Mobility Function element.

11. A method for extending the expiration time period of a telecommunications access token comprising:

receiving a first message from an access and mobility management function (AMF) element of a satellite at a first network resource function (NRF) element of a first public land mobile network (PLMN), where the first message comprises at least a first information element (IE) indicating that the satellite comprises the AMF element and an enhanced Transport Layer Security indication (TLS) certificate that further comprises at least one satellite indication;

determining, by the first NRF element, that features of the AMF element can be allowed at the satellite and can be used by the first PLMN based on the at least one satellite indication in the TLS certificate;

receiving, at the first NRF element, a second message from the AMF element, where the second message comprises a second IE indicating that features of the AMF element are deployed at the satellite;

generating a first authorization message by the first NRF element, the first authorization message comprising a first indication that the AMF element is authorized to use a generated, digitally signed access token comprising at least one extended expiration time period and the at least one satellite indication;

sending the first authorization message and the at least one satellite indication to second NRF element of a second PLMN;

determining, by the second NRF element, that features of the AMF element can be allowed at the satellite and can be used by the second PLMN based on the at least one satellite indication;

generating a second authorization message by the second NRF element, the second authorization message comprising a second indication that the AMF element is authorized to use the generated, digitally signed access token comprising the at least one extended expiration time period and at least one second satellite indication;

sending, from the second NRF element, the second authorization message comprising the generated, digitally signed access token that comprises the at least one extended expiration time period and the at least one second satellite indication to the first NRF element; and sending, from the first NRF element to the AMF element, a third authorization message that authorizes the AMF element to utilize the generated, digitally signed access token that comprises the at least one extended expiration time period and the at least one second satellite indication.

12. The method as in claim 11 further comprising:

receiving, at a network Function (NF) element of the second PLMN, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication; and validating the request message at the NF element.

13. The method as in claim 11 wherein the at least one extended expiration time period comprises an extended expiration time period of up to 48 hours.

14. The method as in claim 12 wherein the NF element comprises one or more NF elements of a fifth generation core network of a mobile telecommunications network.

15. The method as in claim 14 wherein the one or more NF elements are selected from at least a unified data management element, an authentication server function element and a Session Mobility Function element.

16. A method for extending the expiration time period of a telecommunications access token comprising:

sending a first message from an access and mobility management function (AMF) element of a satellite to a first network resource function (NRF) element of a first public land mobile network (PLMN), where the first message comprises at least a first information element (IE) indicating that the satellite comprises access and mobility management function (AMF) element and an enhanced Transport Layer Security indication (TLS) certificate that further comprises at least one satellite indication;

sending, to the first NRF element, a second message from the AMF element, where the second message comprises a second IE indicating that features of the AMF element are deployed at the satellite;

receiving, at the AMF element, an authorization message that comprises a generated, digitally signed access token that comprises at least one extended expiration time period and at least one second satellite indication from the first NRF element; and sending, from the AMF element, to network Function (NF) element of the second PLMN, a request message, the generated, digitally signed access token that comprises the at least one extended expiration time period and the at least one second satellite indication, the request message requesting that the NF element utilize the generated, digitally signed access token that comprises the at least one extended expiration time period and the at least one second satellite indication.

17. The method as in claim 16 wherein the at least one extended expiration time period comprises an extended expiration time period of up to 48 hours.

18. The method as in claim 16 wherein the NF element comprises one or more NF elements of a fifth generation core network of a mobile telecommunications network.

19. The method as in claim 18 wherein the one or more NF elements are selected from at least unified data management element, authentication server function element and Session Mobility Function element.

20. The method as in claim 16 further comprising receiving data from the NF element at the AMF element.

* * * * *